United States Patent Office 3,338,385
Patented Aug. 29, 1967

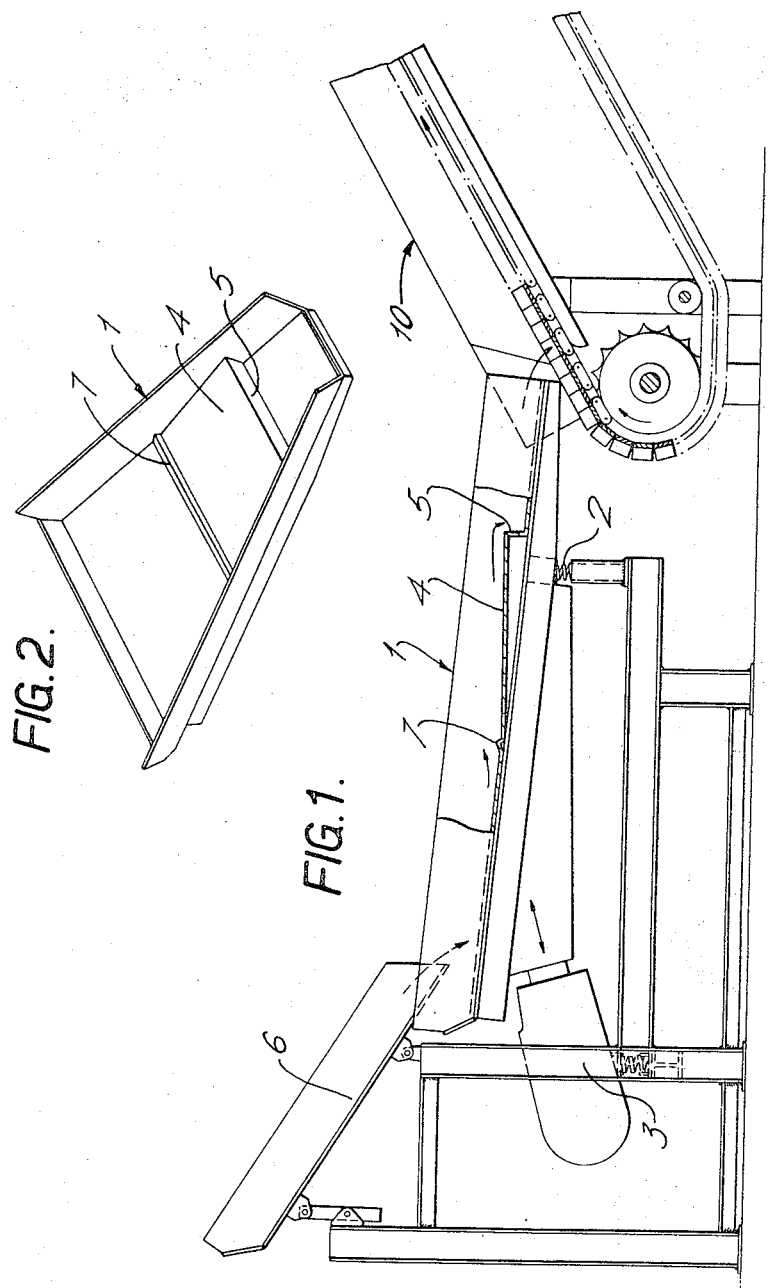

3,338,385
VIBRATORY AND OSCILLATORY CONVEYORS
Thomas Ephraim Howard Sage, Lemsford Court, Welwyn, England
Filed July 19, 1966, Ser. No. 566,266
Claims priority, application Great Britain, July 20, 1965, 30,861/65
1 Claim. (Cl. 198—220)

ABSTRACT OF THE DISCLOSURE

A vibratory or oscillating conveyor with inclined bottom is provided with at least one intermediate portion thereof of reduced inclination terminating in a step and having an edgelike transverse obstacle at its beginning.

---

This invention relates to vibratory and oscillatory conveyors. Such conveyors may be used to move materials or articles horizontally or up or down an incline, and the object of the present invention is to ensure that materials or articles will eventually leave or arrive at a given point of a conveyor system in a regular stream even though they may be unevenly distributed when actually fed on to the conveyor.

To this end according to this invention there is provided a vibratory or oscillatory conveyor in which the surface over which materials or articles move is formed with one or more obstacles adapted to cause the progress of the materials or articles to be delayed, and then, after such delay, to proceed in a regular stream.

An obstacle may be provided by a ridge, step or slope disposed transversely of the direction of movement of the materials or articles along the conveyor. In the case of a conveyor having an already inclined conveyor surface an obstacle may be provided by a variation in the degree of inclination, that is to a lesser extent, terminating in a step.

This invention also provides in combination, a vibratory or oscillatory conveyor adapted to receive materials or articles in bulk and to discharge same from one end thereof, and another conveyor arranged so as to receive and carry away materials or articles discharged from said vibratory or oscillatory conveyor, the latter being formed with one or more obstacles adapted to cause progress of the materials or articles along it to be delayed, and then, after such delay, to proceed in a regular stream for discharge on to said other conveyor.

In the accompany drawings:

FIGURE 1 shows partly in side elevation and partly in section a vibratory or oscillatory conveyor in accordance with this invention, together with part of another conveyor for receiving materials or articles from said vibratory or oscillatory conveyor, and FIGURE 2 is a fragmentary view, drawn on a smaller scale, showing the chute of the vibratory or oscillatory conveyor.

The vibratory or oscillatory conveyor shown in the drawings comprises an inclined chute 1 supported on spring or the like resilient elements 2 and adapted to be vibrated or oscillated by any suitable means, for example a vibratory motor 3. Alternatively the chute 1 may be suspended by means of pivoted links. The chute 1 is comparatively wide at its upper or receiving end and tapers somewhat towards its lower or discharge end.

Near the centre of the chute 1 the inclination of the conveying surface is reduced, the portion 4 of reduced inclination ending in a transverse step 5 after which the inclination of the chute becomes the same as before.

If articles, for example forgings for engine connecting rods, spiders for universal joints or other forgings of spiky or intricate shape, are fed in bulk, that is in batches, on to the upper wider end of the chute 1, for example by means of a feeder chute 6, they move down the chute 1, under the effect of the vibrations or oscillations thereof, until they reach the portion 4 of reduced inclination. Here their movement is retarded or delayed so that they accumulate into a substantial mass or heap. Individual articles also leave the heap from the bottom of the leading end thereof and fall over the step 5; this happens in a regular fashion so that articles continue along the chute 1 in a regular stream.

A conveyor as above described is particularly suitable for feeding articles on to another conveyor 10 by means of which they are carried elsewhere for handling individually such as mechanics, inspectors or others.

In addition to the portion 4 of reduced inclination as above described a ridge 7 may be formed at the start of such portion, this ridge serving to effect a preliminary separation of articles.

Means for vibrating or oscillating the chute may comprise any suitable electromagnetic, electrical mechanical or hydraulic device or devices.

A step 5 or bridge 7 as above referred to may be of zig-zag form or discontinuous from one side of the chute to the other so that a mass or heap of articles tends to be separated out in a direction transverse to its movement as well as in the direction of movement along the chute. Moreover the chute need not be of the shape shown; it could, for example, be wider at its lower or discharge end than at its upper or receiving end.

I claim:

In a vibratory conveyor the improvement comprising in combination a substantially evenly inclined conveyor bottom, an intermediately thereof located bottom portion 4 of reduced inclination continuing the preceding inclined conveyor bottom and stepwise terminating into the following inclined conveyor bottom, and a transversely to said bottom extending edgelike obstacle 7 at the join of said bottom portion of reduced inclination with the preceding inclined conveyor bottom.

References Cited
UNITED STATES PATENTS

| | | | |
|---|---|---|---|
| 299,204 | 5/1884 | Cullen | 198—220 X |
| 322,360 | 7/1885 | Duncan | 198—61 |
| 2,356,961 | 8/1944 | Weyandt. | |
| 2,536,471 | 1/1951 | Schunck | 198—61 X |
| 3,086,008 | 4/1963 | Opila et al. | 198—220 X |

EVON C. BLUNK, *Primary Examiner.*

M. L. AJEMAN, *Assistant Examiner.*